(12) United States Patent
Smith et al.

(10) Patent No.: US 8,694,165 B2
(45) Date of Patent: Apr. 8, 2014

(54) SYSTEM AND METHOD FOR PROVIDING ENVIRONMENTAL CONTROLS FOR A MEETING SESSION IN A NETWORK ENVIRONMENT

(75) Inventors: Laura L. Smith, Seattle, WA (US); Tyrone T. Thorsen, Seattle, WA (US); Todd C. Tatum, San Jose, CA (US); Alan D. Gatzke, Bainbridge Island, WA (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 12/826,225

(22) Filed: Jun. 29, 2010

(65) Prior Publication Data

US 2011/0320044 A1 Dec. 29, 2011

(51) Int. Cl.
G05B 13/00 (2006.01)

(52) U.S. Cl.
USPC .............................. 700/276; 370/352; 709/206

(58) Field of Classification Search
USPC .............................. 700/276; 370/352; 709/206
See application file for complete search history.

(56) References Cited

U.S. PATENT DOCUMENTS

| | | | | |
|---|---|---|---|---|
| 2002/0016639 A1* | 2/2002 | Smith et al. | ........................ | 700/9 |
| 2002/0099563 A1* | 7/2002 | Adendorff et al. | ................. | 705/1 |
| 2002/0133368 A1* | 9/2002 | Strutt et al. | ........................ | 705/1 |
| 2002/0178179 A1* | 11/2002 | Rosenblum et al. | ........... | 707/500 |
| 2004/0003041 A1* | 1/2004 | Moore et al. | .................... | 709/204 |
| 2004/0030750 A1* | 2/2004 | Moore et al. | .................... | 709/204 |
| 2004/0223606 A1* | 11/2004 | Enete et al. | .................... | 379/900 |
| 2005/0086311 A1* | 4/2005 | Enete et al. | .................... | 709/206 |
| 2005/0114829 A1* | 5/2005 | Robin et al. | ................... | 717/101 |
| 2005/0213739 A1* | 9/2005 | Rodman et al. | ........... | 379/202.01 |
| 2005/0288961 A1* | 12/2005 | Tabrizi | ............................... | 705/1 |
| 2007/0220479 A1* | 9/2007 | Hughes | .......................... | 717/100 |
| 2008/0281472 A1* | 11/2008 | Podgorny et al. | .............. | 700/276 |
| 2010/0070421 A1* | 3/2010 | Fazal et al. | ..................... | 705/301 |
| 2010/0204540 A1* | 8/2010 | Oohashi et al. | ................. | 600/27 |
| 2010/0241714 A1* | 9/2010 | Aono et al. | .................... | 709/206 |

OTHER PUBLICATIONS

"How to Control Your Home's Temperature by Phone: How to Use a 5000 and 3045 X10 Thermostat," RealTechNews, retrieved and printed Jun. 29, 2010, 5 pages; http://www.realtechnews.com/2005/08/23/how-to-control-your-homes-temperature-by-phone/.

Cisco Systems, Inc., "Cisco Network Building Mediator," ©2009, 5 pages; http://www.cisco.com/en/US/prod/collateral/ps6712/ps10447/ps10454/data_sheet_c78-543140.pdf.

* cited by examiner

Primary Examiner — Mohammad Ali
Assistant Examiner — Anthony Whittington (57) ABSTRACT

An example method is provided and includes establishing a communication pathway to a building element configured to control at least one environmental setting within a room. The method also includes communicating an ability to control the environmental setting within the room to an endpoint configured to participate in a meeting session. The method further includes receiving a command from the endpoint to adjust the environmental setting during the meeting session. The command can be communicated to the building element. In more specific examples, the method can include registering with one or more application program interfaces (APIs) associated with the building element, and communicating a credential to the building element in order to provide an authentication for controlling the environmental setting. In yet other embodiments, the command to adjust the environmental setting is received via a menu of a user interface provided by a video conferencing platform.

14 Claims, 7 Drawing Sheets

SYSTEM AND METHOD FOR PROVIDING ENVIRONMENTAL CONTROLS FOR A MEETING SESSION IN A NETWORK ENVIRONMENT

TECHNICAL FIELD

This disclosure relates in general to the field of communications and, more particularly, to providing environmental controls for a meeting session in a network environment.

BACKGROUND

In certain architectures, service providers and/or enterprises may seek to offer sophisticated conferencing services for their end users. The conferencing architecture can offer an "in-person" meeting experience over a network. Conferencing architectures can deliver real-time, face-to-face interactions between people using advanced visual, audio, and collaboration technologies. Virtual meetings and conferences have an appeal because they can be held without the associated travel inconveniences and costs. In addition, virtual meetings can provide a sense of community to participants who are dispersed geographically. In certain meeting scenarios, environmental controls may become important. Optimally coordinating environmental factors presents a significant challenge to system designers, network operators, and component manufacturers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes establishing a communication pathway to a building element configured to control at least one environmental setting within a room. The method also includes communicating an ability to control the environmental setting within the room to an endpoint configured to participate in a meeting session. The method further includes receiving a command from the endpoint to adjust the environmental setting during the meeting session. The command can be communicated to the building element. In more specific examples, the method can include registering with one or more application program interfaces (APIs) associated with the building element, and communicating a credential to the building element in order to provide an authentication for controlling the environmental setting. In yet other embodiments, the command to adjust the environmental setting is received via a menu of a user interface provided by a video conferencing platform.

In specific embodiments, the ability to control the environmental setting can extend to multiple rooms. Further, the endpoint can be designated as a meeting host for exclusively controlling the environmental setting for the meeting session. In other examples, the command to adjust the environmental setting is designated using a dual-tone multi-frequency signaling (DTMF) key. Additionally, the command to adjust the environmental setting can be designated using a mobile device. The environmental settings can include a lighting control, a heating control, an air-conditioning control, an aromatic control, a humidity control, and a background noise control.

Example Embodiments

Figure 1:
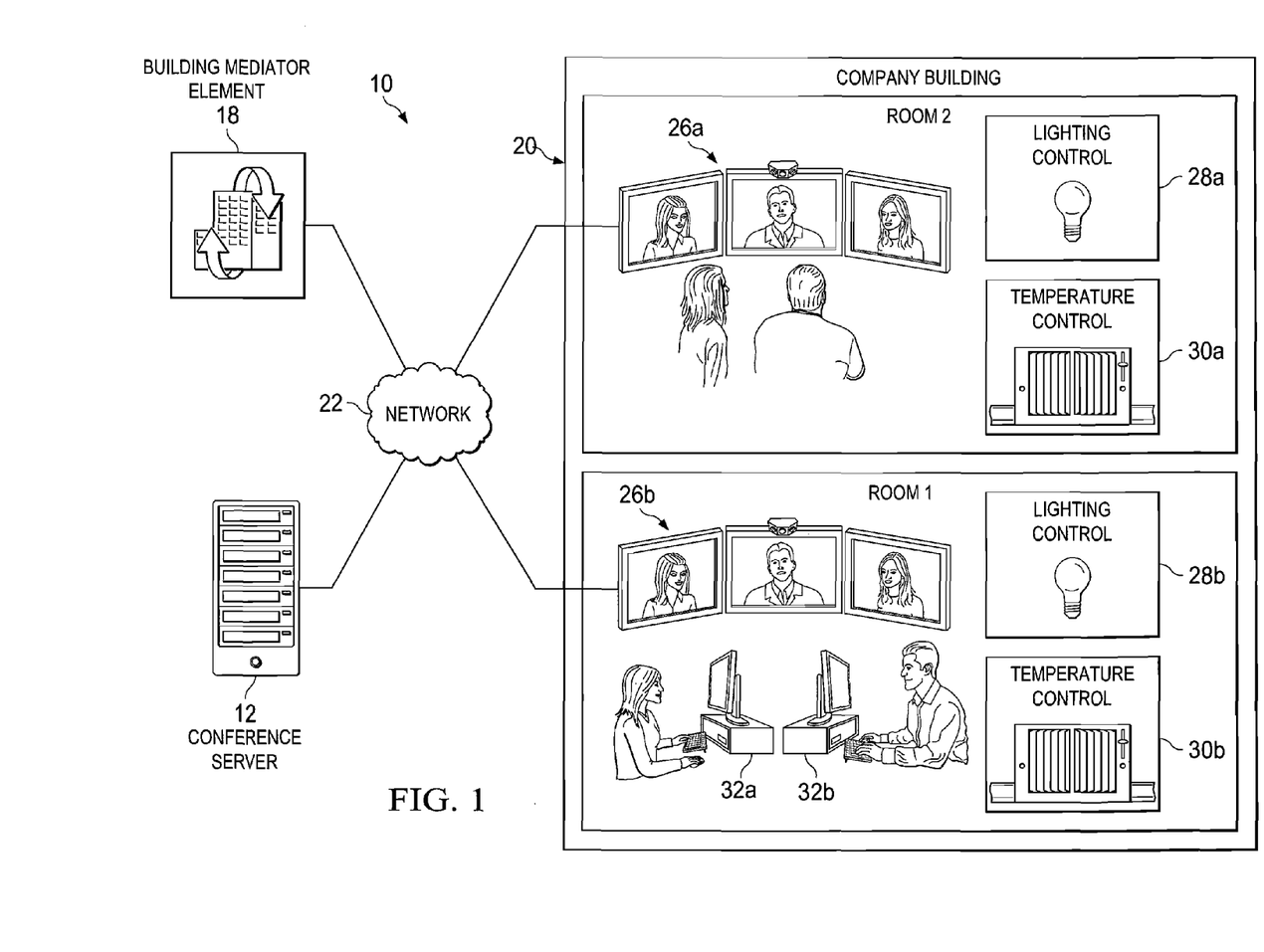
FIG. 1 is a simplified schematic diagram of a communication system for providing environmental controls for a meeting session in accordance with one embodiment of the present disclosure.

Turning to FIG. 1, FIG. 1 is a simplified block diagram illustrating an example communication system 10 in accordance with one embodiment of the present disclosure. Communication system 10 may include a conference server 12, a building mediator element 18, and a network 22. Also depicted in FIG. 1 is a company building 20, which includes two distinct rooms that can be used in video conferencing scenarios. The rooms may be connected over any suitable link and, when in session, can achieve real-time communications (e.g., inclusive of multimedia activities relating to audio, video, sharing, collaboration, etc.) Each of the rooms can be provided with a video conferencing platform 26a-b, a lighting control 28a-b, and a temperature control 30a-b for offering heating and cooling for surrounding areas. In this particular example, there are several endpoints 32a-b that are participating in a meeting session within communication system 10.

In accordance with one particular example of the present disclosure, communication system 10 can offer a meeting system that is integrated with a conference room's physical environment controls. Such a configuration can allow a meeting host to control environmental parameters in several rooms simultaneously. This affords an ability of the meeting host to manipulate environmental conditions in the course of a meeting session. In particular instances, a meeting host could strategically change environmental settings in order to engender specific outcomes. In less competitive scenarios, this environmental control mechanism can provide a convenient way for the meeting host to accommodate guest participants by making quick adjustments to the room environment.

Note that more sophisticated building management systems can include Internet protocol (IP) access for controlling and for monitoring the environmental parameters of a given building. This could include controlling and monitoring air conditioning, lighting, power, fire, and security systems. A building management system (BMS) is a computer-based system, consisting of both hardware and software, that controls and that monitors a building's mechanical, electrical, and electronic equipment. Typically, building management subsystems are implemented in silos, where each subsystem can be provided by a specific vendor (using a specific protocol, reporting paradigm, etc.). Subsystem silos are commonly disconnected from each other, where each silo requires its own specific end-to-end hardware and software components to perform its function.

In contrast to this silo configuration, building mediator element 18 can be configured to aggregate all information from building system parameters (e.g., including lighting, heating, ventilation, air conditioning, temperature, etc.). Building personnel can manage building control systems in any location of the building using a web-based interface, which can have a logical connection to building mediator element 18. Building mediator element 18 can automatically adjust building system controls (e.g., reduce lighting, change temperature settings, etc.) in response to provisioned policies, collected data, or commands issued by an authoritative entity (e.g., via conference server 12).

Building mediator element 18 is configured to collect data from electronic devices within the building, information technology (IT) systems, and energy sources, where many of these components often use diverse reporting protocols. Building mediator element 18 is configured to normalize the data into a common data representation. Building mediator element 18 can perform any-to-any protocol translation and, further, provide information to the end user in a uniform presentation. Such a network-based framework creates a common, standards-based, open platform, which allows enterprise applications, cloud services, and building/IT systems to interact. In one particular arrangement, building mediator element 18 is protocol-agnostic and can extend the network to serve as an effective foundation for sustainability management.

Conference server 12 can interface with building mediator element 18 to control environmental parameters in the context of a meeting session. In response to the commands it is given, building mediator element 18 can control the actual temperature settings, lighting fixtures, humidity levels, background noise, etc. Conference server 12 can relay these commands from a given endpoint 32*a-b* in accordance with one example implementation of the present disclosure. Building mediator element 18 can readily communicate these commands to the rest of the building controls, electronic devices, etc. to achieve the environmental conditions being dictated by a given endpoint. Details relating to the possible signaling and interactions between the components of communication system 10 are provided below with reference to FIGS. 2-7.

Note that before turning to the example flows and infrastructure of example embodiments of the present disclosure, a brief overview of the conferencing environment is provided for the audience. Environmental conditions (e.g., room temperature and lighting) can have an influence on human behavior. For example, an individual's cognitive skills may be diminished in an overly warm, dimly lit room. In contrast, cooler temperatures and brighter lights may engender alertness and enhanced focus. Certain environments may even make people agreeable and receptive to the thoughts of others. Other environments can be configured to spray, pump, or otherwise deliver aromatic fragrances into the air to foster certain attitudes toward buying. In a Telepresence context, participants in a Telepresence room may have an advantage or disadvantage over the people in a remote room depending on the environmental conditions (temperature, lighting, humidity, background noise, etc).

Conference server 12 is configured to offer the host of a meeting session with options such as sharing, muting selected participants, passing the ball during the meeting session, etc. Conference server 12 is also configured to offer the host control over the conference room environmental settings. For example, consider an individual that is engaged in a Telepresence session with a vendor, who is located at a remote site. During pricing negotiations with the vendor, the meeting host can access the meeting controls to slowly increase the temperature and humidity in the remote site. Other options could be offered for increasing background noise at the remote site such that the individuals operating in the remote site are distracted. These extraneous factors can lead to successful results for the person managing the environmental parameters.

This environmental control feature would not only be used for competitive advantages, it could also be used to accommodate a guest who is unfamiliar with the conference room's environment controls. For example, a guest may be uncomfortably cold and ask the host to increase the temperature in the room. As the guest, an individual may feel that it is more appropriate to ask the host to turn up the heat, rather than manually setting the thermostat themselves.

Note that the environmental control feature can allow a meeting host to readily control the meeting room's physical environment from within the conferencing user interface. The conference room and/or Telepresence room (e.g., of FIG. 1) can have various environmental controls associated with temperature, humidity, lighting, white noise, etc. The conference rooms can also have a controller that is integrated with the video conferencing platforms. WebEx, MeetingPlace, and Telepresence are all examples of video conferencing platforms, which could have an integration with the conference room environmental controller. Operationally, when a conference room joins a meeting session, a user interface can advertise different types of environmental adjustments available for that room. This dynamic list can then be presented in a menu to which the meeting host has access. Each room can theoretically have a unique menu list of environmental adjustments that the meeting host could manipulate. The room control mechanism can also allow the host to transfer environmental controls to other meeting participants. For example, the host could give environmental control to the designated presenter (e.g., when they pass the ball to the presenter). The architecture of communication system 10 can allow each conference room to be independently controlled. In one particular example, the original meeting host can maintain authoritative (e.g., override) control. Once the meeting session has ended, the environment of the participating conference rooms can move back to the default environmental settings.

Figure 6:
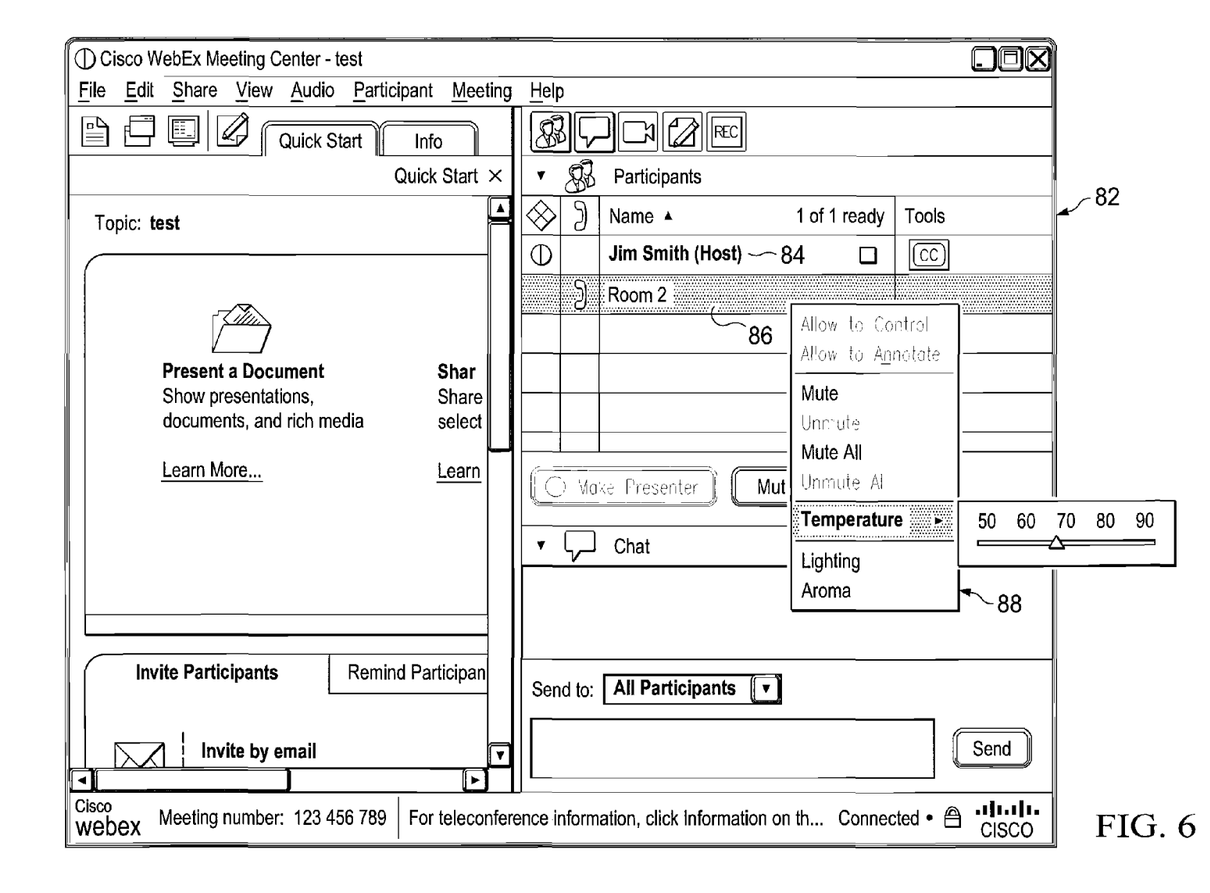
FIG. 6 is a simplified schematic diagram illustrating additional details related to an example user interface graphic for the communication system in accordance with one embodiment.

In particular examples, the environmental controls can be offered as menu selections within the web session's user interface, which is part of the video conferencing software. [An example of such an interface is provided in FIG. 6.] Hence, the environmental controls can be part of the video conferencing package to be controlled by any suitable managing entity (e.g., a host, a manager, an administrator, etc.). It could also be accessible via a telephone user interface (e.g., using dual-tone multi-frequency signaling (DTMF) keys), via voice commands using a speech recognition engine, via a mobile device (e.g., such as a smartphone, iPad, etc.). Alternatively, such controls can be presented as soft keys or physical keys on the conference phone. In one particular arrangement, the default setting can require the meeting host to authenticate themselves before they are permitted to access these controls. Additionally, administrative settings can allow any conference participant to gain access to this set of features. Before turning to some of the additional operations of this architecture, a brief discussion is provided about some of the infrastructure of FIG. 1.

Endpoints 32a-b are representative of a client or a user wishing to participate in a meeting session in communication system 10. Endpoints 32a-b can be associated with individuals, clients, customers, or end users wishing to participate in a meeting session in communication system 10 via some network. The term 'endpoint' is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. Endpoints 32a-b may also be inclusive of a suitable interface to the human user, such as a microphone, a display, or a keyboard or other terminal equipment. Endpoints 32a-b may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Each conferencing room of building 20 may be inclusive of devices used to initiate (or to foster) a communication such as a switch, a console, a proprietary endpoint, a telephone, a camera, a microphone, a dial pad, a bridge, a computer, a personal digital assistant (PDA), a laptop or electronic notebook, a Call Manager element, or any other device, component, element, or object capable of initiating and managing voice, audio, data exchanges, or sessions within communication system 10. Each conferencing room may also include a suitable interface to the human user such as a microphone, a camera, a display, or a keyboard or other terminal equipment.

In operation, conference rooms can use technologies in conjunction with specialized applications and hardware to create a conference that can leverage the network. Communication system 10 can use IP technology deployed in corporations and, further, run on an integrated voice, video, and data network. The system can also support high quality, real-time voice, and video communications with branch offices using broadband connections. They can further offer capabilities for ensuring quality of service (QoS), security, reliability, and high availability for high-bandwidth applications such as video. Furthermore, communication system 10 can operate in conjunction with various conferencing technologies. For example, such arrangements may be inclusive of (but not limited to) virtual conferencing technologies such as Polycom, Acrobat Connect, Elluminate Live, Microsoft Live Meeting, Webex, Second Life, TelePresence, etc. Power and Ethernet connections can be provided for all participants. Participants can use their laptops to access data for the session, join a meeting place protocol or a Web session, or stay connected to other applications throughout the meeting.

Conference server 12 and building mediator element 18 are network elements that manage (or that cooperate with each other in order to manage) environmental controls during a meeting session. As used herein in this Specification, the term 'network element' is meant to encompass routers, switches, gateways, bridges, loadbalancers, firewalls, inline service nodes, proxies, servers, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, conference server 12 and building mediator element 18 are servers that can interact with each other via network 22.

Network 22 represents a series of points or nodes of interconnected communication paths for receiving and transmitting packets of information that propagate through communication system 10. Network 22 offers a communicative interface between sites (and/or participants, rooms, etc.) and may be any local area network (LAN), wireless LAN (WLAN), metropolitan area network (MAN), wide area network (WAN), extranet, Intranet, virtual private network (VPN), or any other appropriate architecture or system that facilitates communications in a network environment. Network 22 can support a transmission control protocol (TCP)/IP, or a user datagram protocol (UDP)/IP in particular embodiments of the present disclosure; however, network 22 may alternatively implement any other suitable communication protocol for transmitting and receiving data packets within communication system 10. Note also that network 22 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, network 22 can foster all such communications and, further, be replaced by any suitable network components for facilitating the propagation of data between participants in a conferencing session.

Figure 2:
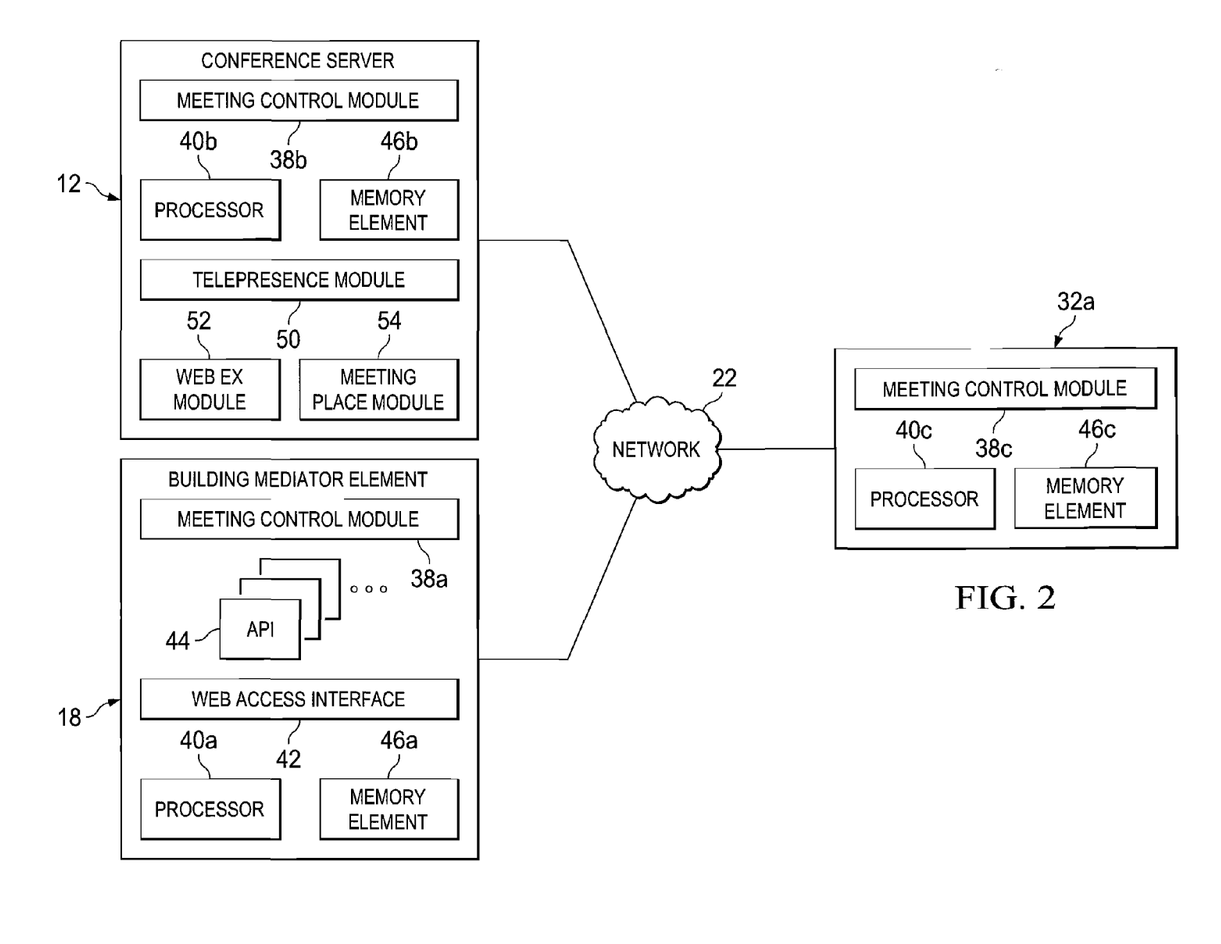
FIG. 2 is a simplified block diagram illustrating additional details related to certain components of the communication system in accordance with one embodiment.

FIG. 2 is a simplified block diagram illustrating additional details associated with particular components of communication system 10. For purposes of detailing certain activities associated with the present disclosure, the depiction of FIG. 2 includes network 22, building mediator element 18, endpoint 32a, and conference server 12. Each of the elements of FIG. 2 may be provisioned to have a respective meeting control module 38a-c, a processor 40a-c, and a memory element 46a-c.

Note that conference server 12 and building mediator element 18 may share (or coordinate) certain processing operations. Using a similar rationale, their respective memory elements may store, maintain, and/or update data in any number of possible manners. Additionally, because conference server 12 and building mediator element 18 can be readily combined into a single unit or server (or certain aspects of these elements can be provided within endpoint 32a), some of these processors may be removed, or otherwise consolidated such that a single processor and a single memory location is responsible for certain activities associated with environmental controls. In a general sense, the arrangement depicted in FIG. 2 may be more logical in its representations, whereas a physical architecture may include various permutations/combinations/hybrids of these elements.

In one example implementation, conference server 12, building mediator element 18, and/or endpoint 32a includes software (e.g., as part of meeting control modules 38a-c) to achieve the environmental control operations, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these environmental control operations.

Building mediator element 18 may include a web access interface 42, which offers a mechanism for a given end user to use for manipulating system controls. Web access interface 42 can be offered after a suitable authentication of the end user. Additionally, web access interface 42 can provide a single point of entry for controlling all of the system controls of a given building, floor, campus, business segment, etc. Building mediator element 18 may also include one or more APIs 44 that allow interested parties to inspect, audit, control, or otherwise access information through building mediator element 18. In one particular example, each API 44 can be associated with a given building control (e.g., a lighting control, an HVAC control, etc.). Building mediator element 18 has the intelligence to interconnect (and to enable) building systems over the IP network. Building mediator element 18 can allow building operation personnel to monitor, measure, and manage energy systems.

Conference server 12 may include a Telepresence module 50, a WebEx module 52, and/or a meeting place module 54. In other embodiments, conference server 12 includes different conferencing platform modules (some of which may be proprietary in nature). In operation, when conference server 12 initializes it can register with one or more APIs being managed by building mediator element 18. In addition, credentials may be exchanged between endpoint 32a and conference server 12, and/or credentials can be exchanged between building mediator element 18 and conference server 12 (or endpoint 32a) in order to provide a suitable authentication mechanism. Once conference server 12 initializes and is registered with building mediator element 18, endpoint 32a can begin manipulating the building controls to achieve certain environmental conditions.

Note that any designated individual can manipulate the system controls in order to achieve some environmental setting. For example, a default could be provided as the host being the individual that controls environmental settings for the meeting. In other scenarios, the presenter can be given this control while he is presenting, where the control would pass back to the host after the presenter has completed his discussion, presentation, activities, etc. In other scenarios, multiple individuals can be given the power to manipulate the environmental system controls. In still other arrangements, the individual who established the meeting is the default person for controlling the environmental settings. Certain other scenarios can designate a given room being given priority for controlling the environmental settings for all participants of the meeting.

Figure 3:
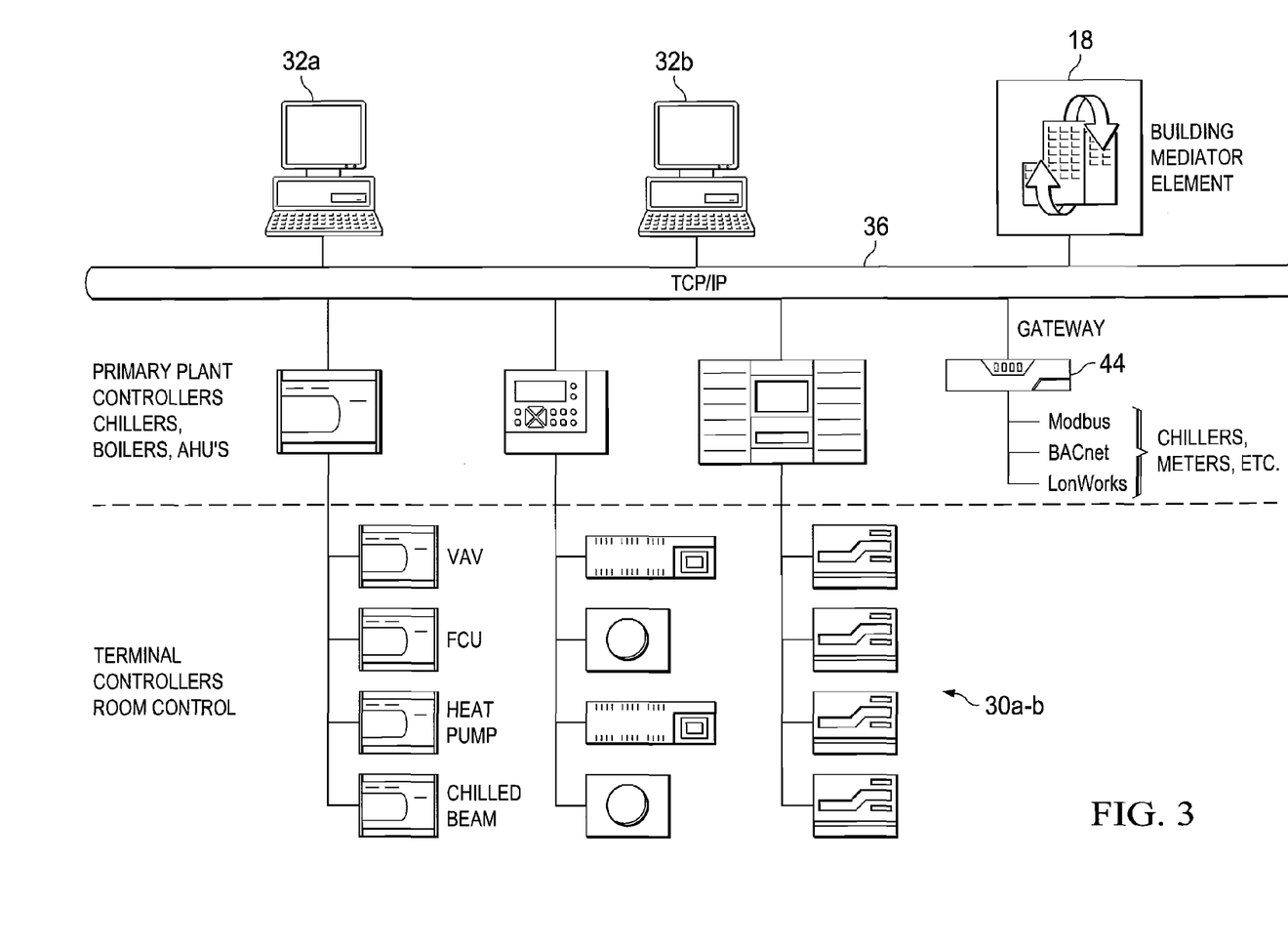
FIG. 3 is a simplified schematic diagram illustrating additional details related to an example infrastructure of the communication system in accordance with one embodiment.

FIG. 3 is a simplified schematic diagram illustrating an example of building control systems. This particular arrangement details temperature control elements 30a-b. Note that a TCP/IP exchange platform 36 is provided for interacting with the various devices, which can control climate settings in a given conferencing environment (e.g., in the participating rooms). The architecture of FIG. 3 is representative of a programmed, computerized, network of electronic devices that are configured to monitor and to control heating ventilation and air conditioning (HVAC) settings. Interaction between endpoints 32a-b and conference server 12 can be performed to create a comfortable working environment according to the commands issued by a given individual.

As is illustrated in FIG. 3, a set of primary plan controllers can be provided for the architecture, where chillers, boilers, air handling units (AHUs) can be used to control terminal controllers. In turn, terminal controllers can offer precise room control for temperature settings. In addition, terminal controllers can include devices such as heat pumps, chilled beams, variable air volume/fan coil units (VAV/FCU), etc.

Also depicted in FIG. 3 is a number of thermostats, climate control devices, electronic gauges, etc. to be used in achieving designated temperature settings.

A gateway 44 is also provisioned in the architecture of FIG. 3. Gateway 44 may have a logical connection to TCP/IP exchange platform 36 in order to receive instructions and commands from any appropriate location or device. For example, gateway 44 may interact with endpoints 32a-b, building mediator element 18, or any other device that is linked to TCP/IP exchange platform 36. Gateway 44 may be tasked with protocol conversions, where it can readily interact with a building automation and control network (BACnet) protocol, LonWorks, Modbus, or any other appropriate protocol, which may be proprietary in nature.

Figure 4:
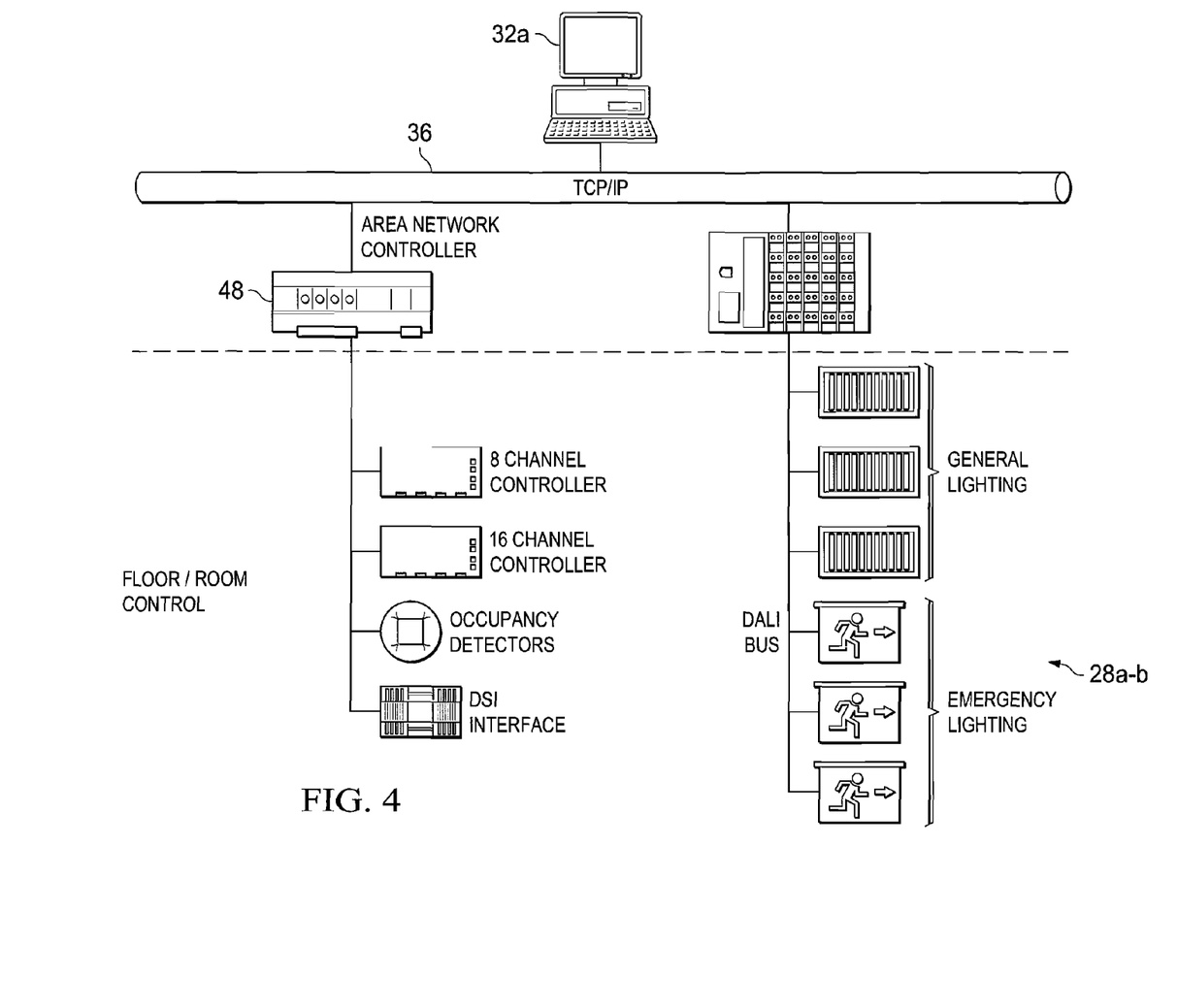
FIG. 4 is a simplified schematic diagram illustrating additional details related to additional example infrastructure of the communication system in accordance with one embodiment.

FIG. 4 is a simplified schematic diagram illustrating another example of building control systems, which includes lighting controls 28a-b. Lighting control systems can provide a centralized management of lighting and, further, offer a suitable working environment, while reducing energy and maintenance costs. Also provided in FIG. 4 is an area network controller 48, which can be provided in conjunction with a router in particular implementations of the present disclosure. Area network controller 48 can interface with TCP/IP exchange platform 36, which has a logical connection to endpoint 32a. Endpoint 32a is representative of the host in this particular example such that he/she can control environmental parameters in multiple rooms. Additionally, FIG. 4 illustrates numerous devices for achieving floor/room control for particular lighting mechanisms. This can include managing channel controllers, a digital signal interface (DSI), occupancy detectors, general lighting fixtures, emergency lighting, etc. In addition, endpoint 32a may also be provisioned with (or have access to) floor plans, alarms, schedules, maintenance data, etc.

Figure 5:
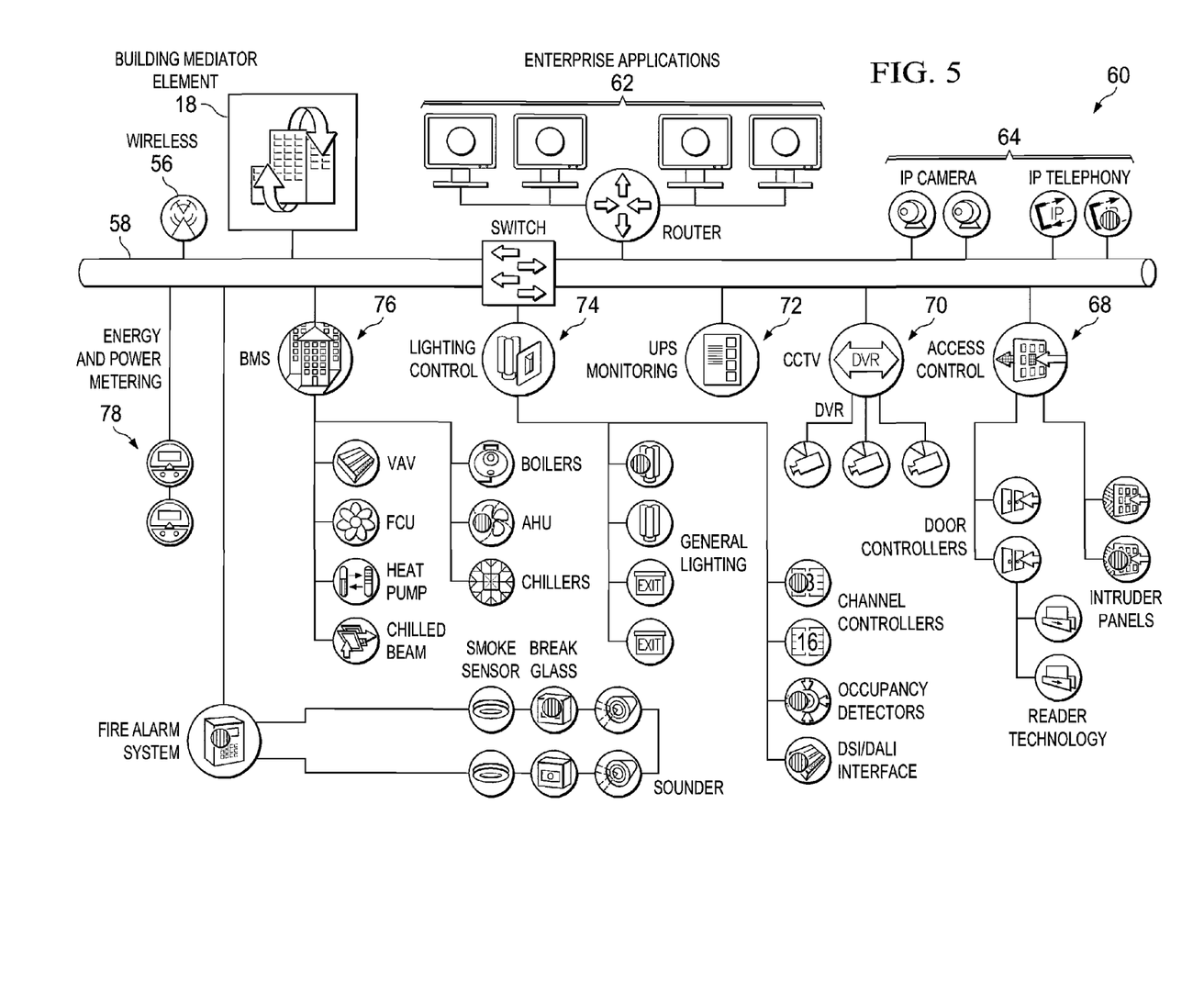
FIG. 5 is a simplified schematic diagram illustrating additional details related to an example infrastructure of the communication system in accordance with one embodiment.

FIG. 5 is a simplified schematic diagram illustrating an example system 60 for achieving certain environmental settings during a conferencing session. FIG. 5 includes a communications platform 58 that can achieve connectivity through a wireless element 56, IP cameras, and/or IP telephony devices (shown generally at element 64). FIG. 5 further includes a series of enterprise applications 62 that may achieve connectivity to communications platform 58 through one or more routers and switches. Similarly, building mediator element 18 can manage control settings via communications platform 58. The control settings may include energy management, building management, facility management, security management, IT network management, maintenance management, climate settings, lighting settings, aroma settings, humidity settings, blind (or curtain, shade, etc.) control (closing, opening, adjusting), or any other environmental setting that could be managed via network communications.

In the particular arrangement of FIG. 5, a number of energy and power metering devices 78 are depicted. Also provided in the architecture of FIG. 5 are fire alarm system mechanisms, lighting controls 74, building management system (BMS) controls 76, uninterruptable power supply (UPS) monitoring controls 72, access controls 68 (inclusive of intruder panels, door controllers, reader technology, etc.), and a closed circuit television (CCTV) 70 (that may include digital video recorders, channel controllers, occupancy detectors, DSI/digital addressable lighting interface (DALI) controls, etc.

FIG. 6 is a simplified schematic diagram illustrating an example user interface 82 for manipulating building control systems. In one particular example, user interface 82 is representative of a webpage for offering information associated with a particular meeting session. This particular meeting session of FIG. 6 involves a WebEx session. In this particular example, a simple menu can be provided to list a set of participants 84 associated with the meeting. Note that the host for this particular meeting has also been identified. Also provided in user interface 82 is a room listing 86, which illustrates the particular rooms being implicated by this meeting session. Conference server 12 may be used to assist in populating some of this information into user interface 82.

In this particular arrangement, a control system menu 88 is provided for the host to manipulate environmental conditions during the meeting. Control system menu 88 includes temperature and lighting controls for room #2 in this particular example. Different controls can be provided for room #1, or these controls can be consistent with the controls being offered for room #2. Aroma controls can also be provided for both rooms #1 and #2.

Note that the environmental controls can be achieved even though the host resides in a different room, or if the host is residing in a different location entirely. In one particular arrangement, conference server 12 can dictate and/or advertise which controls can be manipulated by the host of this particular meeting session. In other scenarios, building mediator element 18 stores this information. Also, building mediator element 18 can dictate (or otherwise relay to conference server 12) the control systems that could possibly be managed by a given end user. Hence, certain controls may not be manageable and, further, this may be based on provisioned settings, the lack of IP communications for certain building controls, the controls being locked by an administrator, the controls being suspended for this particular meeting session, etc. Note that in an effort to minimize delay, the settings for particular rooms can be cached by conference server 12, stored locally in a database, or stored directly within conference server 12.

In one particular example, control system menu 88 may have submenus for further controlling environmental settings. In one general sense, there can be a sub-grouping of environmental controls, which are embedded in the video conferencing software overlay. The particular setting being designated by an end user can be received by conference server 12, which can access a given API 44 within building mediator element 18 for achieving the desired result. In other scenarios, a set of default environmental settings can be selected by the meeting host based on a particular circumstance. In this generic sense, suggested environmental settings can be offered to the host. For example, if negotiations between participants of two different conference rooms became contentious, a drop down menu could be used to offer particular settings that would make individuals more amenable to amicable negotiations. Hence, the host can be empowered to simply select an icon from the menu (e.g., 'improve negotiation discussions'), where such a selection would trigger a group of environmental controls (e.g., a particular aroma being delivered into the remote room, the humidity being decreased for that remote room, and the temperature being moved down for that particular remote room).

Figure 7:
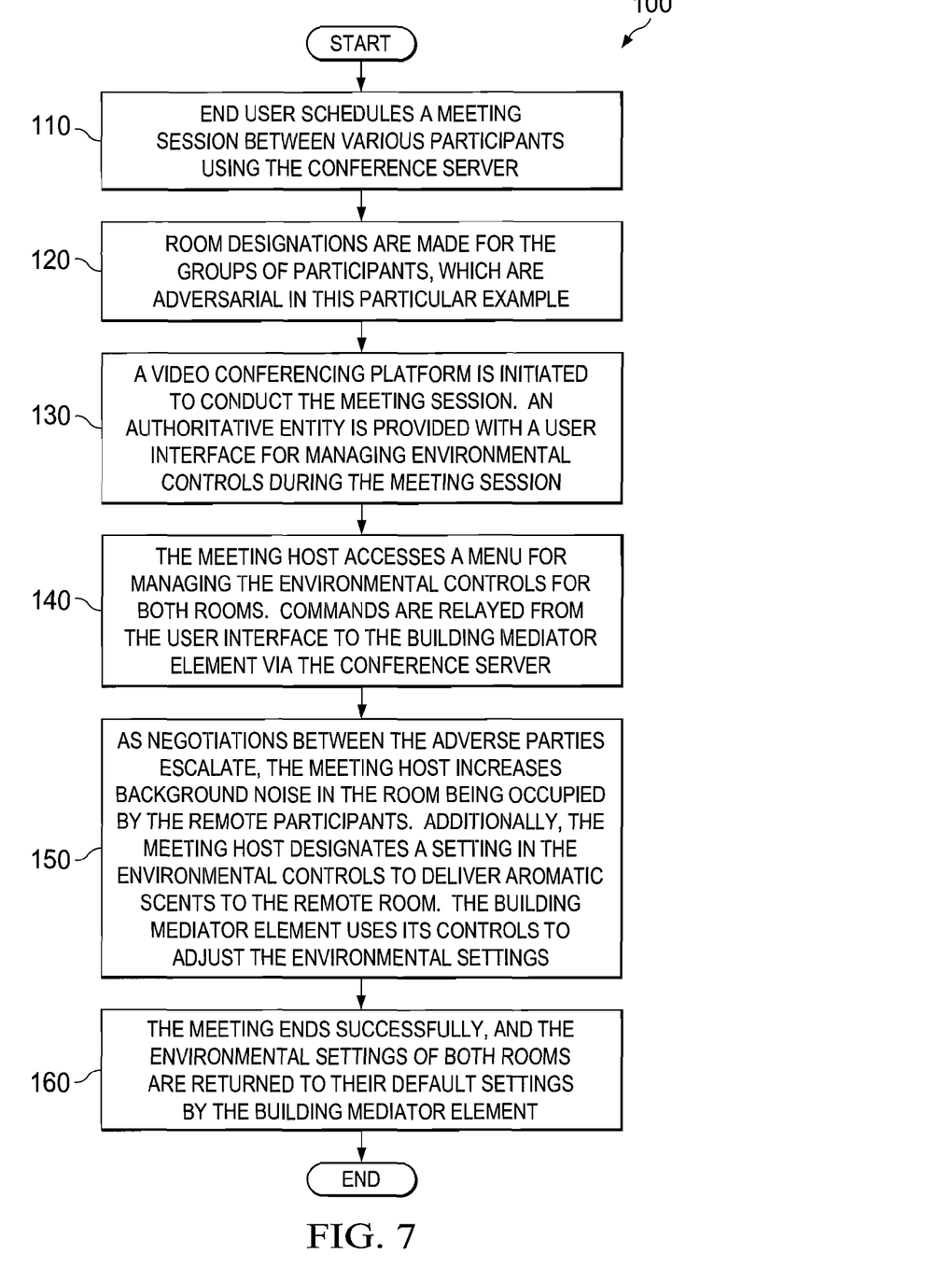
FIG. 7 is a simplified flowchart illustrating a series of example steps for a flow associated with the communication system.

Turning to FIG. 7, FIG. 7 is a simplified flowchart illustrating one example scenario 100 that could be accommodated by communication system 10. The flowchart may begin at step 110, where an end user schedules a meeting session between various participants. This scheduling request may include an interaction with conference server 12 (e.g., via a suitable interface of endpoint 32*a*). At step 120, room designations are made for the groups of participants, which are adversarial in this particular example. At step 130, a video conferencing platform is initiated to conduct the meeting session. An authoritative entity (e.g., the meeting session host) is provided with a user interface for managing environmental controls during the meeting session. Commands can be sent from the user interface to conference server 12, which can relay the commands to building mediator element 18. This is illustrated at step 140. Alternatively, the user interface can have a more direct contact with building mediator element 18.

In this particular example, the meeting host elects to make the remote room unreasonably hot and humid, prior to the meeting commencing (e.g., fifteen minutes before the meeting begins). The meeting host can access a menu to manage the environmental controls for both rooms. The theory from this particular meeting host is that he will initiate the meeting with a goodwill gesture of controlling the remote room's environmental conditions to make the guest participants more comfortable.

As negotiations between the adverse parties escalate, the meeting host accesses the same menu for managing the environmental controls. At step 150, the meeting host increases background noise in the room being occupied by the remote participants. Additionally, the meeting host designates a setting in the environmental controls to deliver aromatic scents to the remote room. Building mediator element 18 can employ its controls to adjust the environmental settings, as instructed. From a psychological and/or anthropological standpoint, these aromatic scents increase the likelihood of a positive resolution to these negotiations. At step 160, the meeting ends successfully, and the environmental controls of both rooms are returned to their default settings by building mediator element 18. These default settings can be triggered by the video conferencing platform recognizing that the meeting has concluded. In other examples, the default settings are triggered by inactivity, timers, motion detection, etc. or any other suitable mechanism.

Note that in certain example implementations, the environmental control functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 2) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, meeting control modules 38*a-c* include software in order to achieve the environmental control functions outlined herein. These activities can be facilitated by building mediator element 18, endpoint 32*a*, and/or conference server 12. Building mediator element 18, endpoint 32*a*, and/or conference server 12 can include memory elements for storing information to be used in achieving the intelligent environmental control, as outlined herein. Additionally, building mediator element 18, endpoint 32a, and/or conference server 12 may include a processor that can execute software or an algorithm to perform the environmental control activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of rooms and sites, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where conference server 12 resides in a particular physical location, conference server 12 can reside in any location, provided it has some connectivity to a suitable network.

It is also important to note that the steps discussed with reference to FIGS. 1-7 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in conferencing environments or arrangements, the present disclosure may be used in any communications environment that could benefit from such technology. Virtually any configuration that seeks to intelligently control environmental settings could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    establishing a communication pathway to a building element configured to control at least one environmental setting within a room;
    establishing a video conference communication pathway to an endpoint configured to participate in a video conference meeting session;
    communicating an ability to control the environmental setting within the room to the endpoint configured to participate in the video conference meeting session via the video conference communication pathway, wherein the ability to control the environmental setting extends to multiple rooms, and wherein the endpoint is designated as a meeting host for exclusively controlling the environmental setting for the video conference meeting session;
    receiving, over the video conference communication pathway via a menu of a user interface provided by a video conferencing platform, a command from the endpoint to adjust the environmental setting during the video conference meeting session;
    communicating the command to the building element; and
    designating, by the meeting host, an other participant in the video conference meeting session to be able to control the environmental setting for the video conference meeting session, wherein the meeting host retains override control over any environmental setting change made by the other participant.

2. The method of claim 1, further comprising:
    registering with one or more application program interfaces (APIs) associated with the building element; and
    communicating a credential to the building element in order to provide an authentication for controlling the environmental setting.

3. The method of claim 1, wherein the command to adjust the environmental setting is designated using a dual-tone multi-frequency signaling (DTMF) key.

4. The method of claim 1, wherein the environmental setting corresponds to an aromatic control.

5. One or more non-transitory computer readable media that has logic encoded therewithin, the logic including code for execution, and when executed by a processor, cause the processor to perform operations comprising:
    establishing a communication pathway to a building element configured to control at least one environmental setting within a room;
    establishing a video conference communication pathway to an endpoint configured to participate in a video conference meeting session;
    communicating an ability to control the environmental setting within the room to the endpoint configured to participate in the video conference meeting session via the video conference communication pathway, wherein the ability to control the environmental setting extends to multiple rooms, and wherein the endpoint is designated as a meeting host for exclusively controlling the environmental setting for the video conference meeting session;
    receiving, over the video conference communication pathway via a menu of a user interface provided by a video conferencing platform, a command from the endpoint to adjust the environmental setting during the video conference meeting session;
    communicating the command to the building element; and
    designating an other participant in the video conference meeting session to be able to control the environmental setting for the video conference meeting session, wherein the meeting host retains override control over any environmental setting change made by the other participant.

6. The non-transitory computer readable medium of claim 5, the operations further comprising:
registering with one or more application program interfaces (APIs) associated with the building element; and
communicating a credential to the building element in order to provide an authentication for controlling the environmental setting.

7. The non-transitory computer readable medium of claim 5, wherein the command to adjust the environmental setting is designated using a dual-tone multi-frequency signaling (DTMF) key.

8. The non-transitory computer readable medium of claim 5, wherein the command to adjust the environmental setting is part of a set of default environmental settings that include a lighting control and a temperature control.

9. An apparatus, comprising:
a memory element configured to store electronic code,
a processor configured to execute instructions associated with the electronic code, and
a meeting control module configured to interface with the processor and further configured to:
 establish a communication pathway to a building element configured to control at least one environmental setting within a room;
 establish a video conference communication pathway to an endpoint configured to participate in a video conference meeting session;
 communicate an ability to control the environmental setting within the room to the endpoint configured to participate in the video conference meeting session, wherein the ability to control the environmental setting extends to multiple rooms, and wherein the endpoint is designated as a meeting host for exclusively controlling the environmental setting for the video conference meeting session;
 receive, over the video conference communication pathway via a menu of a user interface provided by a video conferencing platform, a command from the endpoint to adjust the environmental setting during the video conference meeting session; and
 communicate the command to the building element; and
 designate an other participant in the video conference meeting session to be able to control the environmental setting for the video conference meeting session, wherein the meeting host retains override control over any environmental setting change made by the other participant.

10. The apparatus of claim 9, wherein the meeting control module is further configured to:
register with one or more application program interfaces (APIs) associated with the building element; and
communicate a credential to the building element in order to provide an authentication for controlling the environmental setting.

11. The apparatus of claim 9, wherein the command to adjust the environmental setting is designated using a dual-tone frequency signaling (DTMF) key.

12. The method of claim 1, wherein:
the menu of the user interface provided by the video conferencing platform is included in a list of remote video conference participants, and
receiving the command comprises receiving the command by at least one of the remote video conference participants.

13. The non-transitory computer readable medium of claim 5, wherein:
the menu of the user interface provided by the video conferencing platform is included in a list of remote video conference participants, and
the logic including code for execution further causes the processor to receive the command sent to at least one of the remote video conference participants.

14. The apparatus of claim 9, wherein:
the menu of the user interface provided by the video conferencing platform is included in a list of remote video conference participants, and
the control module is further configured to receive the command sent to at least one of the remote video conference participants.

* * * * *